(12) United States Patent
Fujii et al.

(10) Patent No.: US 8,182,387 B2
(45) Date of Patent: May 22, 2012

(54) PLANETARY CARRIER, PLANETARY GEAR MECHANISM, AND VEHICLE DIFFERENTIAL PROVIDED WITH THE SAME

(75) Inventors: Noriyuki Fujii, Woluwe-Saint-Lambert (BE); Makoto Nishiji, Woluwe-Saint-Lambert (BE)

(73) Assignee: JTEKT Corporation, Osaka-shi (JP)

( * ) Notice: Subject to any disclaimer, the term of this patent is extended or adjusted under 35 U.S.C. 154(b) by 424 days.

(21) Appl. No.: 12/470,678

(22) Filed: May 22, 2009

(65) Prior Publication Data

US 2009/0291798 A1    Nov. 26, 2009

(30) Foreign Application Priority Data

May 23, 2008  (JP) ................................. 2008-135706

(51) Int. Cl.
*F16H 48/06* (2006.01)
(52) U.S. Cl. ...................................................... 475/220
(58) Field of Classification Search .................. 475/248, 475/249, 252
See application file for complete search history.

(56) References Cited

U.S. PATENT DOCUMENTS

| | | | | |
|---|---|---|---|---|
| 1,730,270 | A | * | 10/1929 | Friedell .......................... 475/248 |
| 5,637,050 | A | * | 6/1997 | Chludek ........................ 475/249 |
| 7,086,985 | B2 | * | 8/2006 | Nakajima ..................... 475/248 |
| 2004/0058775 | A1 | | 3/2004 | Yamashita et al. |
| 2005/0130786 | A1 | | 6/2005 | Nakajima |
| 2005/0143212 | A1 | | 6/2005 | Yoshiyama et al. |

FOREIGN PATENT DOCUMENTS

| | | |
|---|---|---|
| EP | 1 498 640 A1 | 1/2005 |
| JP | 2003-314663 | 11/2003 |
| WO | WO 2007/071115 A1 | 6/2007 |

OTHER PUBLICATIONS

Extended Search Report issued Apr. 6, 2011 in International Application No. 09160917.2.

* cited by examiner

*Primary Examiner* — David D Le
*Assistant Examiner* — David J Hlavka
(74) *Attorney, Agent, or Firm* — Oblon, Spivak, McClelland, Maier & Neustadt, L.L.P.

(57) ABSTRACT

A planetary carrier, formed of a cylindrical body, that receives a drive torque from a drive power source and differentially distributes the drive torque to a pair of output shafts, the planetary carrier including a gear holding portion that rotatably holds a planetary gear having two large and small gear portions, of which pitch circle diameters differ from each other. The gear holding portion has a first supporting surface that slidably supports tooth tip surfaces of the gear portion, of which the pitch circle diameter is larger, on a portion except on the radially inner side with respect to the carrier, and a second supporting surface that slidably supports tooth tip surfaces of the gear portion, of which the pitch circle diameter is smaller, on a portion except on the radially outer side with respect to the carrier.

7 Claims, 9 Drawing Sheets

PLANETARY CARRIER, PLANETARY GEAR MECHANISM, AND VEHICLE DIFFERENTIAL PROVIDED WITH THE SAME

INCORPORATION BY REFERENCE

The disclosure of Japanese Patent Application No. 2008-135706 filed on May 23, 2008 including the specification, drawings and abstract is incorporated herein by reference in its entirety.

BACKGROUND OF THE INVENTION

1. Field of the Invention

The invention relates to a planetary carrier, a planetary gear mechanism, and a vehicle differential provided with such a planetary carrier or a planetary gear mechanism. In particular, the invention relates to a planetary carrier and a planetary gear mechanism that transmit the drive torque from a drive power source to planetary gears, and a vehicle differential provided with such a planetary carrier or a planetary gear mechanism.

2. Description of the Related Art

As a conventional vehicle differential, a planetary gear differential is already available, for example (Japanese Patent Application Publication No. 2003-314663 (JP-A-2003-314663)).

The vehicle differential includes: a plurality of planetary gears; a planetary carrier as an input member that rotatably holds the plurality of planetary gears; an internal gear as a first output member that meshes with the planetary gears placed on the planetary carrier; a sun gear as a second output member that is disposed coaxially with the internal gear and meshes with the planetary gears; and a differential case that houses the sun gear, the internal gear, and the planetary carrier in which the plurality of planetary gears are held.

Each of the plurality of planetary gears is a helical gear that has two large and small gear portions of which the pitch circle diameters differ from each other, and the directions of spiral of these gear portions differ from each other.

The planetary carrier rotates receiving a torque from the differential case and transmits the torque from the planetary gears to the sun gear and the internal gear.

The internal gear rotates receiving the torque from the planetary gears at the larger pitch-circle-diameter one of the large and small gear portions and transmits the torque to the rear axle (output shaft).

The sun gear rotates receiving the torque from the planetary gears at the smaller pitch-circle-diameter one of the two large and small gear portions and transmits the torque to the front axle (output shaft).

The differential case rotates receiving the torque from the engine of the vehicle and transmits the torque to the planetary carrier.

According to the above configuration, when a torque from the engine of the vehicle is input to the differential case, the differential case rotates about the rotation axis. When the differential case rotates, the torque is transmitted to the planetary carrier and then transmitted from the planetary carrier to the internal gear and the sun gear through the planetary gears.

In this case, because the front axle and the rear axle are connected to the sun gear and the internal gear, respectively, the torque from the engine is transmitted to the front axle through the differential case, the planetary carrier, the planetary gears, and the sun gear, and at the same time, transmitted to the rear axle through the differential case, the planetary carrier, the planetary gears, and the internal gear.

In such a vehicle differential, cylindrical, gear holding portions, of which the center axes are parallel to the rotation axis of the differential case, are provided in the planetary carrier.

The gear holding portion has a first reception hole that receives the larger pitch-circle-diameter one (large diameter gear portion) of the two large and small gear portions of the planetary gear and a second reception hole that receives the smaller pitch-circle-diameter one (small diameter gear portion) of the two large and small gear portions of the planetary gear.

The first reception hole is partially open on the inner circumferential surface side (radially inner side) and the outer circumferential surface side (radially outer side) of the gear holding portion, and the dimensions of the first reception hole are set so that the inner diameter of the first reception hole is greater than the thickness of the gear holding portion.

The second reception hole is partially open on the inner circumferential surface side (radially inner side) of the gear holding portion and the dimensions of the second reception hole are set so that the inner diameter of the second reception hole is smaller than the inner diameter of the first reception hole.

Thus, the large diameter gear portion is exposed to the outside and meshes with the internal gear through the outer side one of the two inner and outer openings of the first reception hole, and on the other hand, the small diameter gear portion is exposed to the outside and meshes with the sun gear through the opening of the second reception hole.

However, according to the vehicle differential of JP-A-2003-314663, although the tooth tip surfaces of the small diameter gear portion are supported by the gear holding portion of the planetary carrier, part of the tooth tip surfaces of the large diameter gear portion are not supported, and therefore, the planetary gears are inclined due to the reaction force generated due to the mesh with the internal gear and the sun gear As a result, there has been a problem that the planetary gears contact the opening edge portions of the first reception hole and the second reception hole during use, and therefore wear of the planetary gears and/or the gear holding portions occurs.

SUMMARY OF THE INVENTION

The invention provides a planetary carrier and a planetary gear mechanism, with which it is possible to prevent a planetary gear from contacting an opening edge portion of a gear holding portion during use and it is therefore possible to prevent the occurrence of wear of the planetary gear and the gear holding portion, and also provides a vehicle differential provided with such a planetary carrier or a planetary gear mechanism.

A first aspect of the invention is a planetary carrier, formed of a cylindrical body, that receives a drive torque from a drive power source and differentially distributes the drive torque to a pair of output shafts, the planetary carrier including a gear holding portion that rotatably holds a planetary gear having two large and small gear portions, of which pitch circle diameters differ from each other, wherein the gear holding portion has a first supporting surface that slidably supports tooth tip surfaces of one of the two large and small gear portions, of which the pitch circle diameter is larger, on a portion except on one of the radially inner side and the radially outer side with respect to the carrier, and a second supporting surface that slidably supports tooth tip surfaces of the other of the two large and small gear portions, of which the pitch circle diameter is smaller, on a portion except on the other of the radially inner side and the radially outer side with respect to the carrier.

A second aspect of the invention is a planetary gear mechanism including: a planetary gear having two large and small gear portions, of which pitch circle diameters differ from each other; a planetary carrier, formed of a cylindrical body, that receives a drive torque from a drive power source and differentially distributes the drive torque to a pair of output shafts, the planetary carrier including a gear holding portion that rotatably holds the planetary gear; an internal gear that is disposed coaxially with the planetary carrier and meshes with one of the two large and small gear portions; and a sun gear that is disposed coaxially with the internal gear and meshes with the other of the two large and small gear portions, wherein the gear holding portion has a first supporting surface that slidably supports tooth tip surfaces of one of the two large and small gear portions, of which the pitch circle diameter is larger, on a portion except on one of the radially inner side and the radially outer side with respect to the carrier, and a second supporting surface that slidably supports tooth tip surfaces of the other of the two large and small gear portions, of which the pitch circle diameter is smaller, on a portion except on the other of the radially inner side and the radially outer side with respect to the carrier.

A third aspect of the invention is a vehicle differential including a planetary gear mechanism, the planetary gear mechanism having: a planetary gear having two large and small gear portions, of which pitch circle diameters differ from each other; a planetary carrier, formed of a cylindrical body, that receives a drive torque from a drive power source and differentially distributes the drive torque to a pair of output shafts, the planetary carrier including a gear holding portion that rotatably holds the planetary gear; an internal gear that is disposed coaxially with the planetary carrier and meshes with one of the two large and small gear portions; and a sun gear that is disposed coaxially with the internal gear and meshes with the other of the two large and small gear portions, wherein the gear holding portion of the planetary carrier has a first supporting surface that slidably supports tooth tip surfaces of one of the two large and small gear portions, of which the pitch circle diameter is larger, on a portion except on one of the radially inner side and the radially outer side with respect to the carrier, and a second supporting surface that slidably supports tooth tip surfaces of the other of the two large and small gear portions, of which the pitch circle diameter is smaller, on a portion except on the other of the radially inner side and the radially outer side with respect to the carrier.

According to the invention, it is possible to prevent a planetary gear from contacting an opening edge portion of a gear holding portion during use and it is therefore possible to prevent the occurrence of wear of the planetary gear and the gear holding portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

First Embodiment

Figure 1:
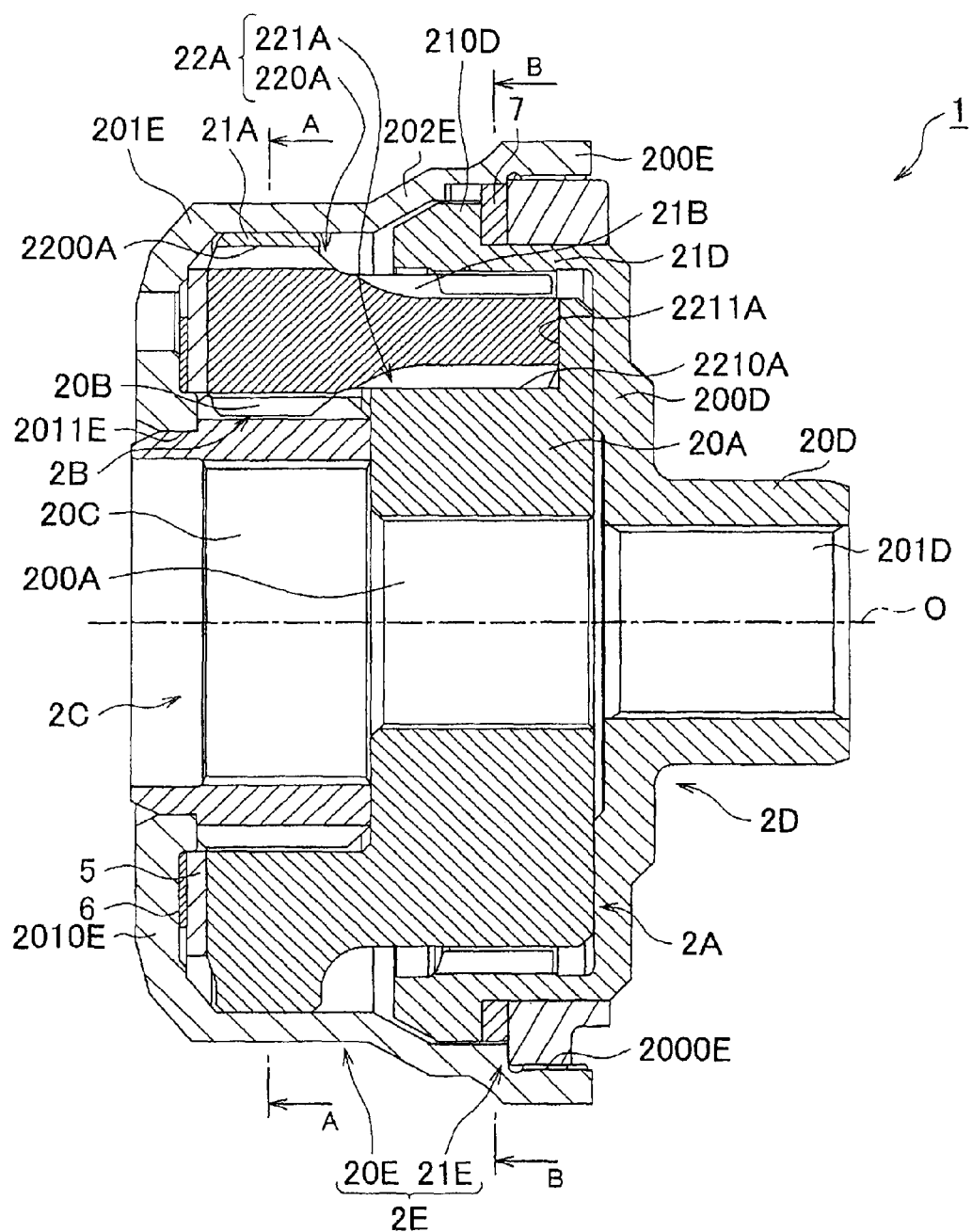
FIG. 1 shows a sectional view for explaining a vehicle differential according to a first embodiment of the invention.
Figure 2:
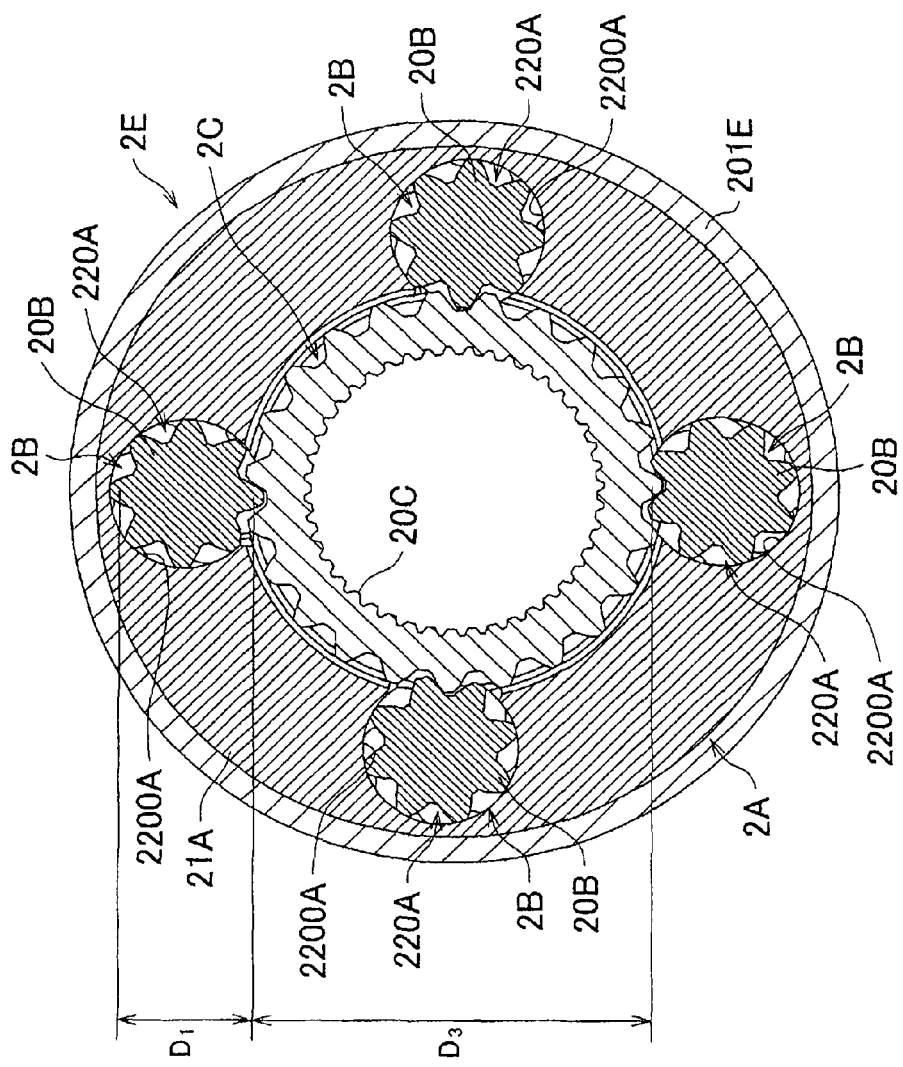
FIG. 2 shows a sectional view taken along line A-A of FIG. 1.
Figure 3:
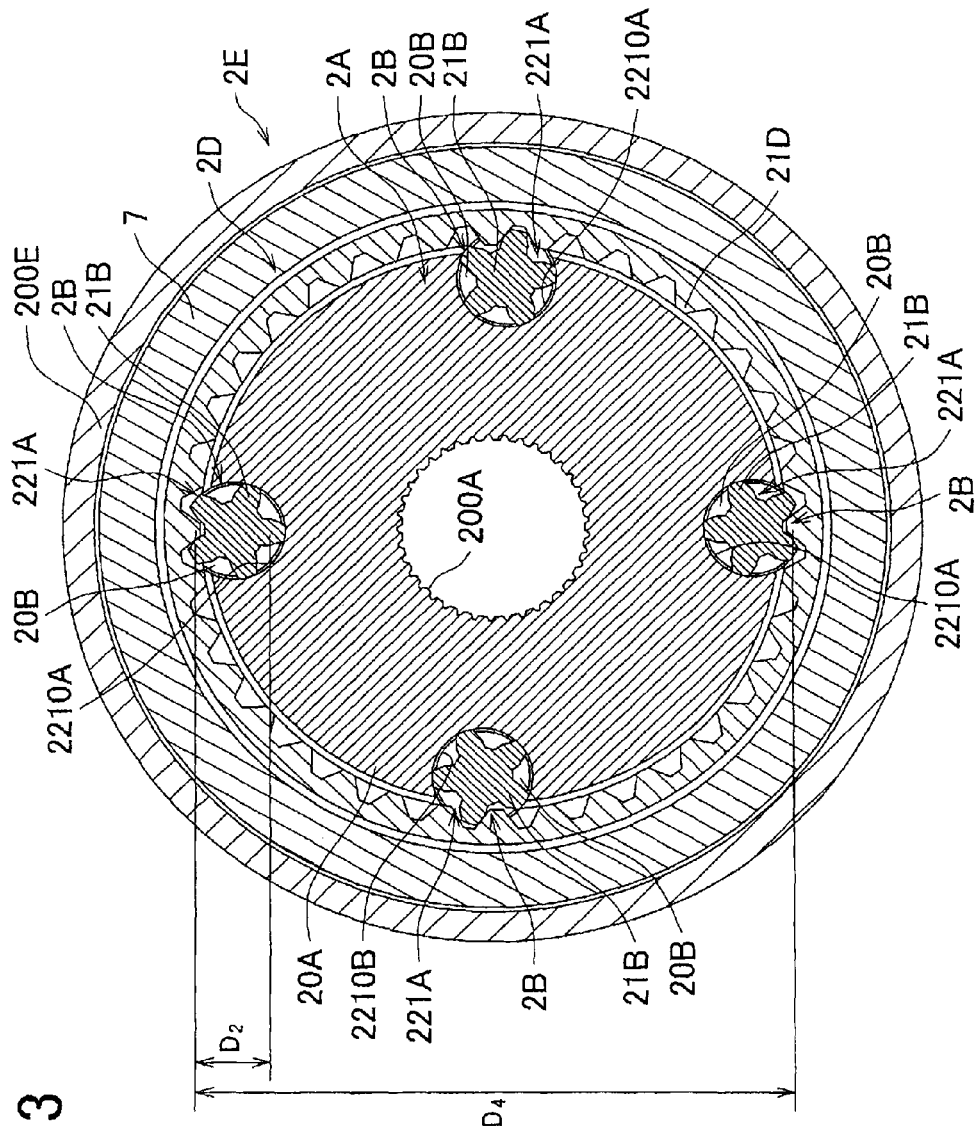
FIG. 3 shows a sectional view taken along line B-B of FIG. 1.
Figure 4:
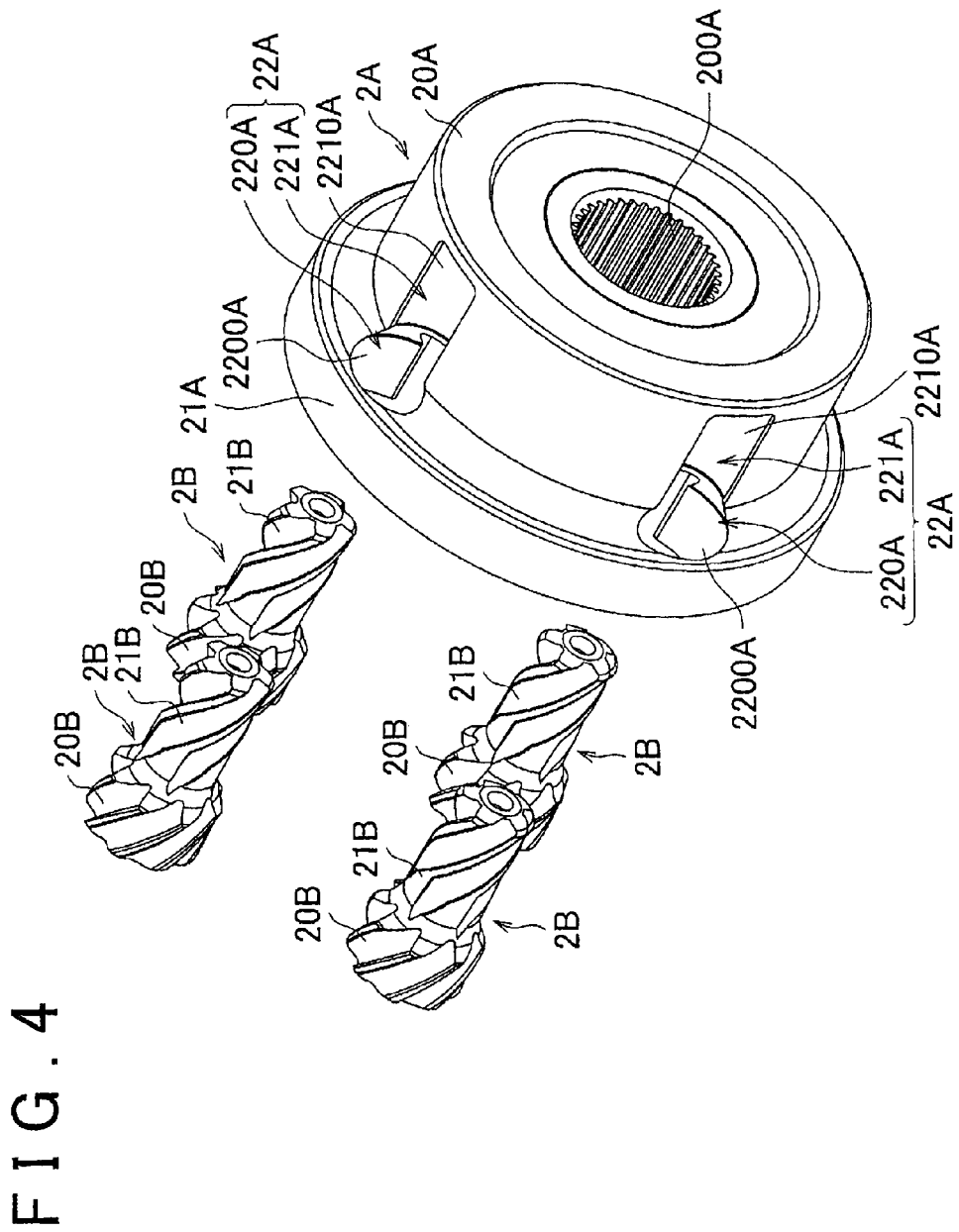
FIG. 4 is an exploded perspective view showing an input-side gear held in a carrier of the vehicle differential according to the first embodiment of the invention when viewed from one side.
Figure 5:
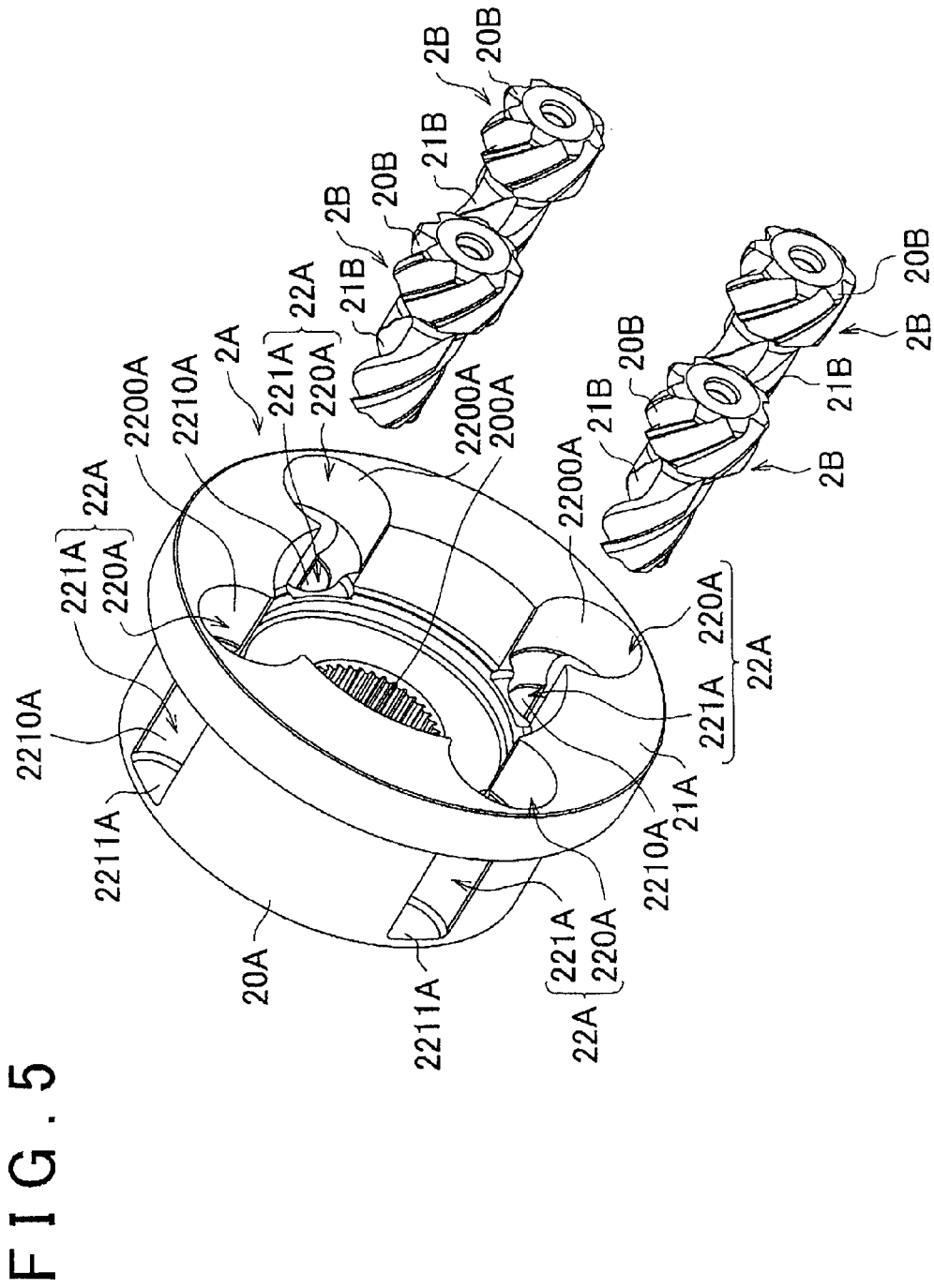
FIG. 5 is an exploded perspective view showing an input-side gear held in the carrier of the vehicle differential according to the first embodiment of the invention when viewed from the other side.
Figure 6:
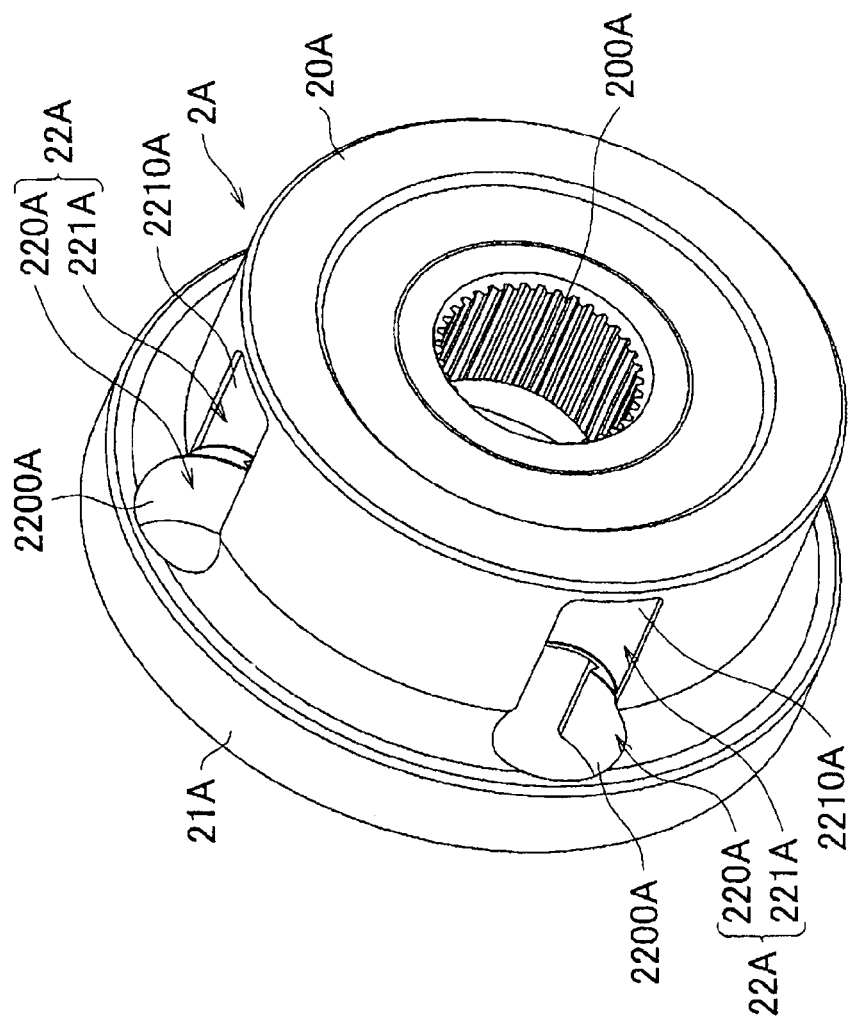
FIG. 6 is a perspective view showing the carrier of the vehicle differential according to the first embodiment of the invention when viewed from one side.
Figure 7:
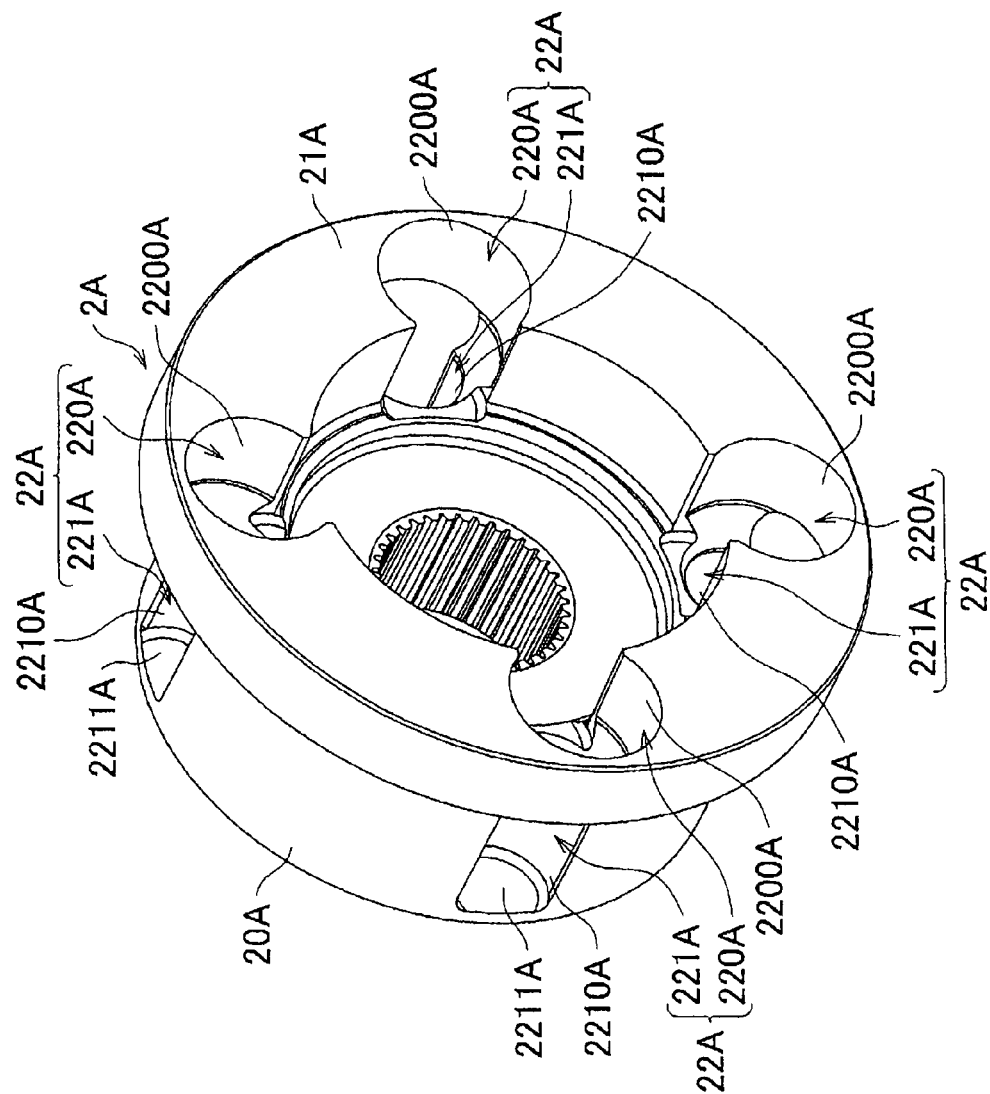
FIG. 7 is a perspective view showing the carrier of the vehicle differential according to the first embodiment of the invention when viewed from the other side.

FIG. 1 is a sectional view for explaining a vehicle differential according to a first embodiment of the invention. FIG. 2 is a sectional view taken along line A-A of FIG. 1. FIG. 3 is a sectional view taken along line B-B of FIG. 1. FIG. 4 is an exploded perspective view showing an input-side gear that is held in a carrier of the vehicle differential according to the first embodiment of the invention when viewed from one side. FIG. 5 is an exploded perspective view showing the input-side gear that is held in the carrier of the vehicle differential according to the first embodiment of the invention when viewed from the other side. FIG. 6 is a perspective view showing the carrier of the vehicle differential according to the first embodiment of the invention when viewed from one side. FIG. 7 is a perspective view showing the carrier of the vehicle differential according to the first embodiment of the invention when viewed from the other side.

(Overall Construction of Vehicle Differential)

The vehicle differential indicated at reference numeral 1 in FIGS. 1 to 3 is, for example, used as a center differential of a four-wheel drive vehicle in which drive torque from a drive power source is distributed to the front wheel side and the rear wheel side. The vehicle differential includes: a planetary carrier 2A, serving as an input member, which rotates receiving the drive torque (engine torque) from the drive power source; a plurality of planetary gears 2B, 2B, . . . , serving as the input-side gears, which receive the torque from the planetary carrier 2A; a sun gear 2C, serving as an output-side gear on one side, which meshes with the plurality of planetary gears 2B, 2B, . . . ; an internal gear 2D, serving as an output-side gear on the other side, which is disposed coaxially with the sun gear 2C and meshes with the plurality of planetary gears 2B, 2B, . . . ; and a differential case 2E that houses the internal gear 2D, the sun gear 2C, the planetary carrier 2A, and the plurality of planetary gears 2B, 2B, . . . .

(Configuration of Planetary Gear)

As shown in FIGS. 1 to 7, the planetary carrier 2A has a carrier base portion 20A and a carrier brim portion 21A. The planetary carrier 2A is interposed between the sun gear 2C and the internal gear 2D, and is formed as a stepped cylindrical body in which the inner diameter and the outer diameter of the carrier base portion 20A differ from the inner diameter and the outer diameter of the carrier brim portion 21A, respectively. The planetary carrier 2A is designed to rotate about a rotation axis O. The planetary carrier 2A is provided with gear holding portions 22A that rotatably hold the planetary gears 2B, 2B, . . . .

The gear holding portion 22A includes a first reception hole 220A and a second reception hole 221A and extends through the carrier base portion 20A and the carrier brim portion 21A.

The first reception hole 220A is open inwardly in the radial direction of the planetary carrier 2A (at the inner circumferential surface of the carrier brim portion 21A) and open in the direction parallel to the rotation axis O (on both the sun gear side and the internal gear side), and is provided in the carrier brim portion 21A. The inner circumferential surface of the first reception hole 220A (torque transmitting surface) is formed by a first gear supporting surface 2200A, which is a curved surface that fits tooth tip surfaces of gear portions 20B, 20B, . . . (described later) of the planetary gears 2B, 2B, . . . . More specifically, the first gear supporting surface 2200A is formed in a cylindrical shape that has a curvature slightly greater than the curvature of the tooth tip surfaces of the gear portions 20B, 20B, . . . .

The second reception hole 221A is open outwardly in the radial direction of the planetary carrier 2A (at the outer circumferential surface of the carrier base portion 20A) and open in the direction parallel to the rotation axis O (on the sun gear side), is connected to the first reception hole 220A, and is provided in the carrier base portion 20A. The inner circumferential surface (torque transmitting surface) of the second reception hole 221A is formed by a second gear supporting surface 2210A, which is a curved surface that fits tooth tip surfaces of gear portions 21B, 21B, . . . (described later) of the planetary gears 2B, 2B, . . . . The bottoms of the second reception holes 221A are formed by third gear supporting surfaces 2211A, which slidably support the axial end surfaces (free end surfaces) of the gear portions 21B, 21B, . . . of the planetary gears 2B, 2B, . . . .

The carrier base portion 20A is formed by a cylindrical body that has a hole open in the rotation axis direction of the planetary carrier 2A. The inner circumferential surface of the carrier base portion 20A is provided with a spline fitting portion 200A for connecting the carrier base portion 20A with an input shaft (not shown) so that the input shaft can move in the axial direction and cannot rotate relative to the carrier base portion 20A.

The carrier brim portion 21A is integral with the carrier base portion 20A and formed by an annular body that has a hole open in the rotation axis direction of the planetary carrier 2A. The outer diameter of the carrier brim portion 21A is set greater than the outer diameter of the carrier base portion 20A, and the inner diameter of the carrier brim portion 21A is set greater than the inner diameter of the carrier base portion 20A.

(Configuration of Planetary Gears)

As shown in FIGS. 1, 4, and 5, the planetary gears 2B, 2B, . . . are helical gears, each having two large and small gear portions 20B and 21B, of which the pitch circle diameters $D_1$ and $D_2$ ($D_1 > D_2$) differ from each other (the direction of spiral is the same) (that is, the gear portion 20B has the gear dimension of the pitch circle diameter $D_1$ and the gear portion 21B has the gear dimension of the pitch circle diameter $D_2$), and each of the planetary gears 2B, 2B, . . . is rotatably housed in the first reception hole 220A and the second reception hole 221A of the planetary carrier 2A.

As shown in FIGS. 1 and 2, the gear portion 20B meshes with the sun gear 2C and is rotatably housed in the first reception hole 220A. The gear portion 20B is designed to transmit a torque exerted by the planetary carrier 2A to an output shaft on the left side in FIG. 1 (output shaft to be connected to the front axle) through the sun gear 2C. Annular thrust washers 5 and 6, positioned at the periphery of the sun gear 2C, are interposed between the axial tip end surface (free end surface) of the gear portion 20B and the bottom surface of the differential case 2E. The thrust washer 5 rotates with the planetary carrier 2A and the thrust washer 6 rotates with the differential case 2E. Thus, when a thrust force toward the left in FIG. 1 is exerted on the planetary gears 2B, 2B, . . . , the thrust washer 6 is pressed against the thrust washer 5 and a differential motion-limiting force that limits the relative rotation between the planetary carrier 2A and the differential case 2E is produced. The number of teeth $Z_1$ of the gear portion 20B is set greater than the number of teeth $Z_2$ of the gear portion 21B ($Z_1 > Z_2$). In this embodiment, $Z_1 = 8$ and $Z_2 = 5$.

As shown in FIGS. 1 and 3, the gear portions 21B mesh with the internal gear 2D and are rotatably housed in the second reception holes 221A. The gear portion 21B is designed to transmit a torque exerted by the planetary carrier 2A to an output shaft on the right side (output shaft to be connected to the rear axle) through the internal gear 2D.

(Configuration of Sun Gear)

As shown in FIGS. 1 and 2, the sun gear 2C meshes with the gear portions 20B, 20B, . . . of the planetary gears 2B, 2B, . . . , is rotatably placed coaxially with the internal gear 2D, and is housed in the carrier brim portion 21A of the planetary carrier 2A. On the whole, the sun gear 2C is a cylindrical helical gear having the axis the same as the rotation axis O. The sun gear 2C is designed to receive a torque from the gear portions 20B, 20B, . . . of the planetary gears 2B, 2B, . . . and output the torque to the output shaft on the left side in FIG. 1. The inner circumferential surface of the sun gear 2C is provided with the spline fitting portion 20C for connecting the sun gear 2C with an output shaft on the left side so that the output shaft can move in the axial direction and cannot rotate relative to the sun gear 2C. The pitch circle diameter $D_3$ and the number of teeth $Z_3$ of the cylindrical helical gear of the sun gear 2C are set greater than the pitch circle diameter $D_1$ and the number of teeth $Z_1$ of the gear portions 20B, 20B, . . . of the planetary gears 2B, 2B, . . . , respectively.

(Configuration of Internal Gear)

As shown in FIGS. 1 and 3, the internal gear 2D has a boss portion 20D and a gear portion 21D, meshes with the gear portions 21B, 21B, . . . of the planetary gears 2B, 2B, . . . , and is rotatably placed coaxially with the planetary carrier 2A. On the whole, the internal gear 2D is a cylindrical helical gear having the axis the same as the rotation axis O. The internal gear 2D receives a torque from the gear portions 21B, 21B, . . . of the planetary gears 2B, 2B, . . . , and outputs the torque to the output shaft on the right side in FIG. 1.

As shown in FIG. 1, on the whole, the boss portion 20D is a cylindrical body and placed at the position opposed to the sun gear 2C with the planetary carrier 2A interposed therebetween. A brim portion 200D is provided on the outer circumferential surface of the boss portion 20D, the brim portion 200D having a flange end surface that faces the end surface opposite to the sun gear-side end surface of the planetary carrier 2A. The inner circumferential surface of the boss portion 20D is provided with a spline fitting portion 201D for connecting the boss portion 20D with the output shaft on the right side so that the output shaft can move in the axial direction and cannot rotate relative to the boss portion 20D.

As shown in FIG. 1, the gear portion 21D meshes with the gear portions 21B, 21B, . . . of the planetary gears 2B, 2B, . . . , is positioned around the periphery of the planetary carrier 2A, and is integrated with the boss portion 20D of the internal gear 2D with the brim portion 200D interposed therebetween. A brim portion 210D, positioned on the sun gear side, is integrally provided on the outer circumferential surface of the gear portion 21D. The pitch circle diameter $D_4$ and the number of teeth $Z_4$ of the gear portion 21D are set greater than the pitch circle diameter $D_3$ and the number of teeth $Z_3$ of the sun gear 2C. Thus, the pitch circle diameters of the input side gears (gear portions 20B, 20B, . . . and gear portions 21B, 21B, . . . of the planetary gears 2B, 2B, . . . ) and the pitch circle diameters of the output side gears (sun gear 2C and internal gear 2D) satisfy the relation, $D_3/D_1 < D_4/D_2$. Thus, the torque transmitted from the engine to the internal gear 2D through the gear portions 21B, 21B, . . . of the planetary gears 2B, 2B, . . . is higher than the torque transmitted from the engine to the sun gear 2C through the gear portions 20B, 20B, . . . of the planetary gears 2B, 2B, . . . . The ratio between the torque transmitted to the internal gear 2D and the torque transmitted to the sun gear 2C is $D_4/D_2 : D_3/D_1$, and this embodiment is configured so that the torque transmitted to the internal gear 2D is twice or more as high as the torque transmitted to the sun gear 2C.

(Configuration of Differential Case)

As shown in FIGS. 1 to 3, the differential case 2E includes: a cylindrical case body 20E, having a bottom portion, that is open in one direction along the rotation axis O; and a substantially annular ring bolt 21E that covers the opening of the case body 20E (a part inserting opening 2000E described later). An insertion hole through which an output shaft is inserted is formed in the bottom portion of the differential case 2E. The end portion of the sun gear 2C that is one of the axial end portions of the sun gear 2C on the side opposite to the planetary carrier side is welded to the inner edge of the insertion hole, so that the differential case 2E and the sun gear 2C are joined so as to rotate together. On the whole, the differential case 2E is a stepped, hollow structure that houses the planetary carrier 2A (planetary gears 2B, 2B, . . . ) and part of the sun gear 2C and the internal gear 2D therein.

The case body 20E is formed of a stepped cylindrical body, having a bottom portion, that includes three, differently-sized cylindrical portions 200E to 202E, of which the inner diameters differ from each other and of which the outer diameters differ from each other.

The large-diameter cylindrical portion 200E has the part inserting opening 2000E on the ring bolt 21E side and is positioned on one side of the case body 20E with respect to the axial direction (on the ring bolt side).

The small-diameter cylindrical portion 201E is positioned on the other side of the case body 20E with respect to the axial direction. The cylindrical portion 201E is provided with a bottom portion 2010E that is opposed to the axial tip end surfaces of the planetary gears 2B, 2B, . . . (gear portions 20B, 20B, . . . ) with the thrust washers 5 and 6 interposed therebetween, and a gear insertion hole 2011E that passes through the bottom portion 2010E and into which the sun gear 2C is inserted.

The middle-diameter cylindrical portion 202E is interposed between the cylindrical portion 200E and the cylindrical portion 201E and the dimensions of the cylindrical portion 202E are determined so that the inner diameter and the outer diameter of the cylindrical portion 202E gradually increase from the sun gear side to the internal gear side.

The ring bolt 21E is screwed into the part inserting opening 2000E of the case body 20E (cylindrical portion 200E). The ring bolt 21E is designed to function as a movement restriction member that restricts the movement of the internal gear 2D in the direction opposite to the sun gear side along the rotation axis O. An annular thrust washer 7, through which the gear portion 21D of the internal gear 2D is inserted, is interposed between the ring bolt 21E and the brim portion 210D of the internal gear 2D.

(Operation of Vehicle Differential)

When the torque from the engine of the vehicle is input to the planetary carrier 2A, the planetary carrier 2A is driven to rotate about the rotation axis O. When the planetary carrier 2A is driven to rotate, the torque is transmitted to the planetary gears 2B, 2B, . . . , and further transmitted from the gear portions 20B, 20B, . . . of the planetary gears 2B, 2B, . . . to the sun gear 2C, and at the same time transmitted from the gear portions 21B, 21B, . . . of the planetary gears 2B, 2B, . . . to the internal gear 2D. Because the sun gear 2C is spline fitted onto the output shaft to be connected to the front axle and the internal gear 2D is spline fitted onto the output shaft to be connected to the rear axle, the torque from the engine is transmitted to the front and rear output shafts through the planetary carrier 2A and the planetary gears 2B, 2B, . . . , and through the sun gear 2C and the internal gear 2D.

When the vehicle is traveling straight and there is no slip between the road surface and the front and rear wheels, the torque from the engine transmitted to the planetary carrier 2A causes the planetary carrier 2A to rotate about the rotation axis O and causes the planetary gears 2B, 2B, . . . to revolve about the center axis of the sun gear 2C and the internal gear 2D without rotation, about their own axes, so that the planetary gears 2B, 2B, . . . , the sun gear 2C and the internal gear 2D rotate with the planetary carrier 2A. Thus, according to the ratio between the numbers of teeth, $D_3/D_1 : D_4/D_2$, the torque from the engine is transmitted to the front and rear output shafts without any loss, immediately responding to the unbalance of the ground reaction forces within the range of the limited slip differential torque during static friction, so that the front and rear output shafts rotate at the same speed.

On the other hand, when the rear wheels are stuck in mud and a slip occurs, the planetary gears 2B, 2B, . . . rotate while meshing with the output gears 2C and 2D, so that the front-side output shaft rotates at a speed lower than the rotational speed of the planetary carrier 2A and the rear-side output shaft rotates at a speed higher than the rotational speed of the planetary carrier 2A. Thus, the torque from the engine is distributed to the front and rear output shafts in a predetermined uneven ratio such that a higher torque is transmitted to the axle on the front side on which the ground reaction force is higher, so that the loss of the total drive force on both the front and rear sides is reduced to secure running through performance.

In this embodiment, the limited slip differential torque produced between the output side gears (sun gear 2C and internal gear 2D) by the mechanism described below while an engine torque is input to the planetary carrier 2A.

When the planetary gears 2B, 2B, . . . rotate while a torque is input thereto, frictional resistance occurs between the respective tooth tip surfaces of the planetary gears 2B, 2B, . . . (gear portions 20B, 20B, . . . and gear portions 20B, 20B, . . . ) and the first and second gear supporting surfaces 2200A and 2210A of the planetary carrier 2A (first reception hole 220A and second reception hole 221A), and such frictional resistance produces the limited slip differential torque between the sun gear 2C and the internal gear 2D.

In addition, when the planetary gears 2B, 2B, . . . rotate while a torque is input thereto, thrust force is exerted on the gears (planetary gears 2B, 2B, . . . , and sun gear 2C and internal gear 2D) along the rotation axis O at the gear meshing interface. In this case, the axial tip end surfaces of the planetary gears 2B, 2B, . . . (gear portions 21B, 21B, . . . ) rub against the third gear supporting surfaces 2211A of the planetary carrier 2A (second reception holes 221A) and the bottom portion 2010E of the differential case 2E (front case 20E), and the sun gear 2C and the internal gear 2D move in the compressive direction or away from each other (toward the ring bolt side). When this occurs, a frictional resistance is generated between the rubbing portions that arise due to the thrust force produced at the planetary gears 2B, 2B, . . . (gear portions 21B, 21B, . . . ), and such a frictional resistance also produces the limited slip differential torque between the sun gear 2C and the internal gear 2D.

Effects of First Embodiment

According to the above-described first embodiment, the following effects can be achieved.
(1) The tooth tip surfaces of the gear portions 20B, 20B, . . . are supported by the portions of the planetary carrier 2A except on the radially inner side with respect to the planetary carrier 2A and the tooth tip surfaces of the gear portions 21B, 21B, . . . are supported by the portions of the planetary carrier 2A except on the radially outer side with respect to the planetary carrier 2A, so that the planetary gears 2B, 2B, . . . are not inclined due to the reaction force generated due to the mesh between the planetary gears 2B, 2B, . . . , and the sun gear 2C and the internal gear 2D. Thus, it is possible to prevent the planetary gears 2B, 2B, . . . from contacting the opening edge portions of the first reception holes 220A and the second reception holes 221A during use, and it is therefore possible to prevent the occurrence of wear of the planetary gears 2B, 2B, . . . and the gear holding portion 22A.
(2) The limited slip differential torque is obtained by virtue of the frictional resistance between the tooth tip surfaces of the gear portions 20B, 20B, . . . and the first gear supporting surfaces 2200A and the frictional resistance between the tooth tip surfaces of the gear portions 21B, 21B, . . . and the second gear supporting surfaces 2210A.

Second Embodiment

Figure 8:
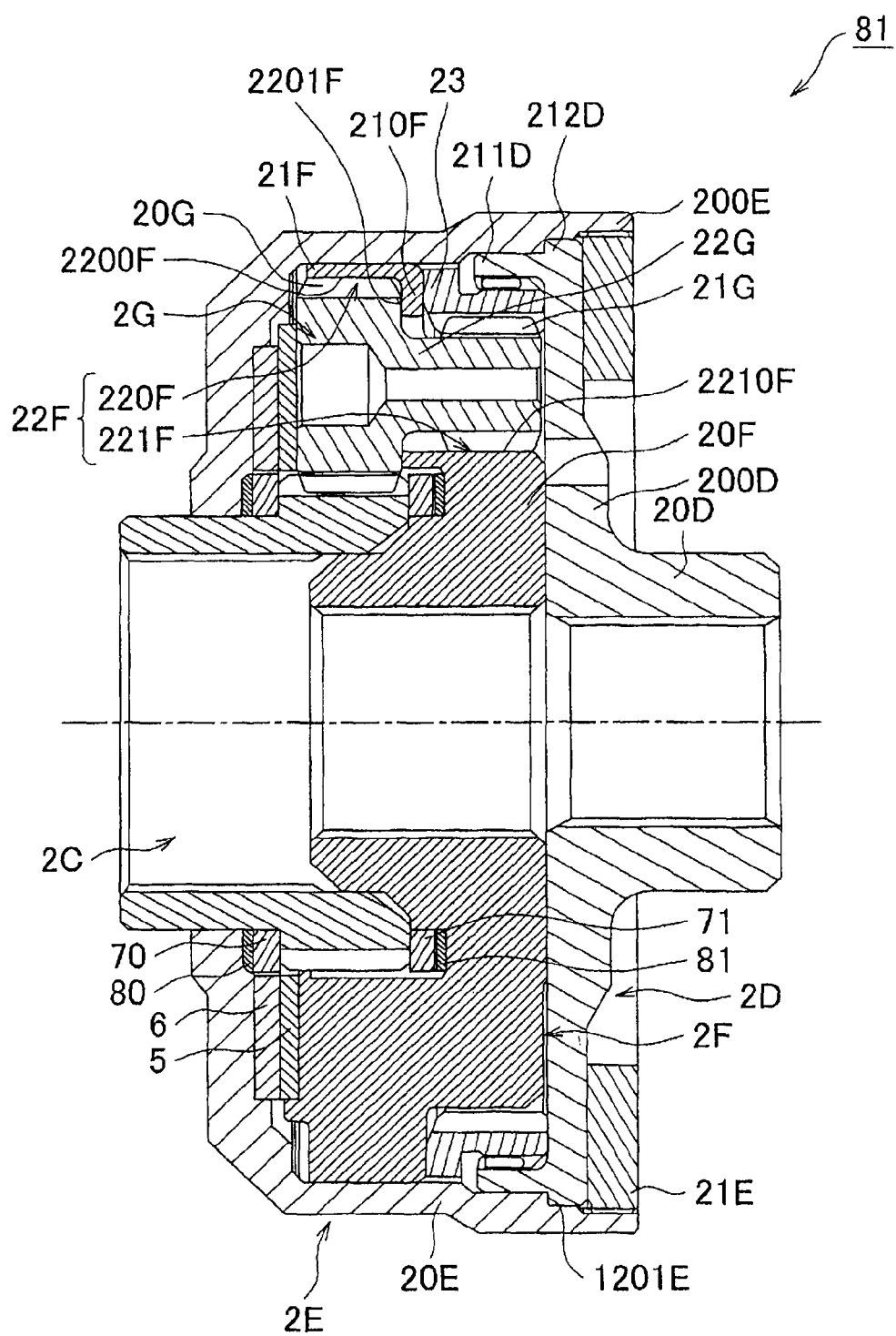
FIG. 8 is a sectional view for explaining a vehicle differential according to a second embodiment of the invention.
Figure 9:
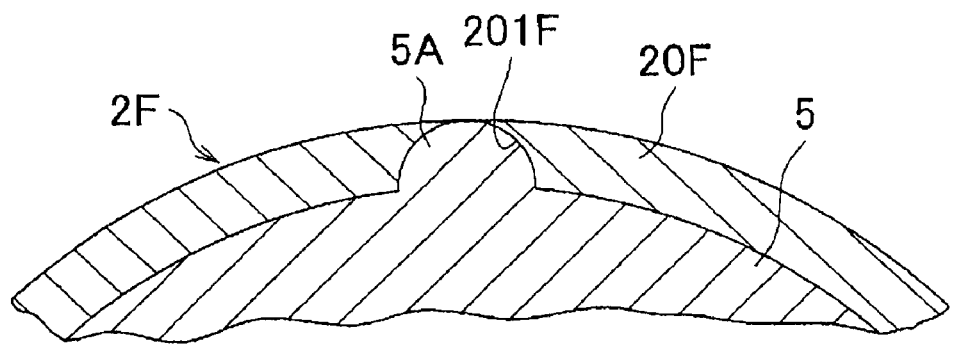
FIG. 9 is a sectional view showing a state in which a planetary carrier and a thrust washer of the vehicle differential according to the second embodiment of the invention mesh with each other.

FIG. 8 is a sectional view for explaining a vehicle differential according to a second embodiment of the invention. FIG. 9 is a sectional view showing a state in which a planetary carrier and a thrust washer of the vehicle differential according to the second embodiment of the invention mesh with each other.

Major differences between the second embodiment and the first embodiment are the shape of planetary gears and the shape of a planetary carrier that rotatably supports the planetary gears. The following description is focused on differences between the first and second embodiments and the common portions are designated by the same reference numerals in FIGS. 8 and 9 and the description thereof is omitted.

As shown in FIG. 8, the planetary gear 2G in the vehicle differential 81 of the second embodiment has a large-diameter gear portion 20G corresponding to the gear portion 20B of the first embodiment and a small-diameter gear portion 21G corresponding to the gear portion 21B of the first embodiment, and the large-diameter gear portion 20G and the small-diameter gear portion 21G are integrally connected by an intermediate portion 22G.

The planetary carrier 2F has a carrier brim portion 21F corresponding to the carrier brim portion 21A of the first embodiment, and a first gear supporting surface 2200F corresponding to the first gear supporting surface 2200A of the first embodiment rubs against the tooth tip surfaces of the large-diameter gear portion 20G of the planetary gear 2G. The planetary carrier 2F has a second gear supporting surface 2210F corresponding to the second gear supporting surface 2210A of the first embodiment, and the second gear supporting surface 2210F rubs against the tooth tip surfaces of the small-diameter gear portion 21G of the planetary gear 2G.

A second reception hole 221F of the planetary carrier 2F that receives the small-diameter gear portion 21G of the planetary gear 2G is open in the axial direction on the side facing the brim portion 200D, and the axial end surface of the small-diameter portion 21G of the planetary gear 2G faces the brim portion 200D of the internal gear 2D. Specifically, the planetary carrier 2F is not provided with the portion corresponding to the third gear supporting surface 2211A of the first embodiment.

A wall portion 210F that radially inwardly protrudes from an axial end portion of the first gear supporting surface 2200F is formed between the first reception hole 220F and the second reception hole 221F of the planetary carrier 2F. The wall portion 210F is formed to have dimensions such that the small-diameter gear portion 21G of the planetary gear 2G supported by the gear holding portion 22F can be inserted in the axial direction and the large-diameter gear portion 20G cannot be inserted in the axial direction. That is, the wall portion 210F forms a bottom portion (fourth gear supporting surface) 2201F of the first reception hole 220F and the movement of the planetary gear 2G in the direction from the gear portion 20G side toward the gear portion 21G side (direction toward the right side in FIG. 8) is restricted by the contact of the end surface of the gear portion 20G on the intermediate portion (stepped portion) 22G side with the wall portion 210F. Thus, the axial end surface of the small-diameter gear portion 21G is not brought into contact with the brim portion 200D of the internal gear 2D.

A cylindrical portion 211D that extends from near the periphery of the brim portion 200D in the axial direction is formed on the internal gear 2D. The outer diameter of the cylindrical portion 211D is smaller than the outer diameter of the brim portion 200D and an annular protruding portion 212D corresponding to the difference between the outer diameter of the cylindrical portion 211D and the outer diameter of the brim portion 200D is formed on the outer side of the cylindrical portion 211D when the internal gear 2D is viewed from the left in FIG. 8. A concave portion 1201E into which the annular protruding portion 212D is fitted is formed in the differential case 2E and the ring bolt 21E is screwed into the differential case 2E with the annular protruding portion 212D fitted into the concave portion 1201E, so that the internal gear 2D and the differential case 2E are joined so that the internal gear 2D and the differential case 2E cannot rotate relative to each other. An annular gear portion 23 is placed on the inner side of the cylindrical portion 211D and is spline fitted into the cylindrical portion 211D so that the gear portion 23 cannot rotate relative to the cylindrical portion 211D. A helical gear that meshes with the small-diameter gear portion 21G of the planetary gear 2G is formed on the inner circumferential surface of the gear portion 23.

The thrust washers 5 and 6 are interposed between one end surface of the planetary carrier 2F and the bottom portion of the differential case 2E. As shown in FIG. 9, a protrusion 5A is formed on the periphery of the thrust washer 5 and the protrusion 5A is fitted into a concave portion 201F provided in an end surface of the planetary carrier 2F, so that the planetary carrier 2F and the thrust washer 5 are prevented from rotating relative to each other. In a similar manner, the thrust washer 6 is placed on the bottom portion of the differential case 2E so that the thrust washer 6 and the differential case 2E cannot rotate relative to each other.

Thrust washers 71 and 81 are disposed between the sun gear 2C and a carrier base portion 20F of the planetary carrier 2F. Thrust washers 70 and 80 are disposed between the sun gear 2C and the bottom portion of the differential case 2E. The thrust washer 81 cannot rotate relative to the planetary carrier 2F and the thrust washer 80 cannot rotate relative to the differential case 2E. The thrust washers 70 and 71 cannot rotate relative to the sun gear 2C. Thus, when the planetary carrier 2F and the sun gear 2C rotate relative to each other, the thrust washers 81 and 71 rub against each other and when the differential case 2E and the sun gear 2C rotate relative to each other, the thrust washers 80 and 70 rub against each other.

Effects of Second Embodiment

According to the above-described second embodiment, the following effects can be achieved in addition to the effects of the first embodiment.

(1) No bottom portion (the portion corresponding to the third gear supporting surface 2211A of the first embodiment) is formed for the second reception hole 221F of the planetary carrier 2F, so that it is possible to reduce the axial length of the planetary carrier 2F.

(2) The gear portion 23 is provided separately from the cylindrical portion 211D, so that it is facilitated to form the gear teeth of the internal gear 2D, and it is made possible to form gear teeth to the end portion that abuts the brim portion 200D. Thus, the clearance for tools that was required when the gear teeth were machined becomes unnecessary, so that it is possible to reduce the axial length of the internal gear 2D. Thus, it is possible to reduce the axial length of the entire vehicle differential, and the size and the weight of such a vehicle differential can be reduced.

While a vehicle differential of, the invention has been described with reference to the above embodiments, the invention is not limited to the above embodiments. The invention can be implemented in various modes within the scope without departing from the spirit of the invention and the modifications as recited below, for example, can be adopted.

(1) While in the description of the embodiments, the case has been described where the pitch circle diameters of the input side gears (gear portions 20B, 20B, . . . and gear portions 21B, 21B, . . . of the planetary gears 2B, 2B, . . . ) and the pitch circle diameters of the output side gears (sun gear 2C and internal gear 2D) satisfy the relation, $D_3/D_1 < D_4/D_2$. However, the invention is not limited to such a case, and the pitch circle diameters may be set to the dimensions that satisfy the relation, $D_3/D_1 = D_4/D_2$. In this case, the torque split ratio (TSR), which is the ratio between the torque transmitted to the sun gear and the reference torque transmitted to the internal gear, is set to 50:50, and the same amount of torque is transmitted through the sun gear and the internal gear.

The pitch circle diameters of the gears may be set to the dimensions such that the pitch circle diameters of the input side gears (gear portions 20B, 20B, . . . and gear portions 21B, 21B, . . . of the planetary gears 2B, 2B, . . . ) and the pitch circle diameters of the output side gears (sun gear 2C and internal gear 2D) satisfy the relation, $D_3/D_1 > D_4/D_2$. In this case, the torque transmitted through the internal gear is lower than the torque transmitted through the sun gear.

(2) While in the description of the embodiments, the case has been described where four planetary gears 2B, 2B, . . . having the gear portions 20B, 20B, . . . and the gear portions 21B, 21B, . . . that mesh with the sun gear 2C and the internal gear 2D, respectively, are held in the planetary carrier 2A (gear holding portions 22A), the invention is not limited to such a case and another number of planetary gears may be placed in a planetary carrier.

What is claimed is:

1. A planetary carrier, formed of a cylindrical body, that receives a drive torque from a drive power source and differentially distributes the drive torque to a pair of output shafts, the planetary carrier comprising a gear holding portion that rotatably holds a planetary gear having two large and small gear portions whose pitch circle diameters differ from each other, wherein the gear holding portion has a first supporting surface that slidably supports tooth tip surfaces of one of the two large and small gear portions whose pitch circle diameter is larger, on all peripheral portions thereof except at one of a radially inner side and a radially outer side with respect to the carrier, and a second supporting surface that slidably supports tooth tip surfaces of the other of the two large and small gear portions whose pitch circle diameter is smaller, on all peripheral portions thereof except at the other of the radially inner side and the radially outer side with respect to the carrier.

2. The planetary carrier according to claim 1, wherein the first supporting surface is a curved surface having a curvature such that the first supporting surface fits the tooth tip surfaces of the one of the two large and small gear portions whose pitch circle diameter is larger, and the second supporting surface is a curved surface having a curvature such that the second supporting surface fits the tooth tip surfaces of said the other of the two large and small gear portions whose pitch circle diameter is smaller.

3. The planetary carrier according to claim 1, wherein the gear holding portion has a third supporting surface that slidably supports an axial tip end surface of said other of the two large and small gear portions whose pitch circle diameter is smaller.

4. The planetary carrier according to claim 1, wherein the gear holding portion has a fourth supporting surface that axially contacts a step portion between the two large and small gear portions of the planetary gear and restricts an axial movement of the planetary gear.

5. A planetary gear mechanism comprising:

a planetary gear having two large and small gear portions whose pitch circle diameters differ from each other;

a planetary carrier, formed of a cylindrical body, that receives a drive torque from a drive power source and differentially distributes the drive torque to a pair of output shafts, the planetary carrier including a gear holding portion that rotatably holds the planetary gear;

an internal gear that is disposed coaxially with the planetary carrier and meshes with one of the two large and small gear portions; and a sun gear that is disposed coaxially with the internal gear and meshes with the other of the two large and small gear portions, wherein the gear holding portion has a first supporting surface that slidably supports tooth tip surfaces of one of the two large and small gear portions whose pitch circle diameter is larger, on all peripheral portions thereof except on one of a radially inner side and a radially outer side with respect to the carrier where the one of the two large and small gear portions meshes with one of the internal gear and the sun gear, and a second supporting surface that slidably supports tooth tip surfaces of the other of the two large and small gear portions whose pitch circle diameter is smaller, on all peripheral portions thereof except on the other of the radially inner side and the radially outer side with respect to the carrier where the other of the two large and small gear portions meshes with the other of the internal gear and the sun gear.

6. The planetary gear mechanism according to claim 5, wherein the two large and small gear portions of the planetary gear are helical gears whose directions of spiral are the same.

7. A vehicle differential comprising a planetary gear mechanism, the planetary gear mechanism including:
- a planetary gear having two large and small gear portions whose pitch circle diameters differ from each other;
- a planetary carrier, formed of a cylindrical body, that receives a drive torque from a drive power source and differentially distributes the drive torque to a pair of output shafts, the planetary carrier including a gear holding portion that rotatably holds the planetary gear;
- an internal gear that is disposed coaxially with the planetary carrier and meshes with one of the two large and small gear portions; and
- a sun gear that is disposed coaxially with the internal gear and meshes with the other of the two large and small gear portions, wherein the gear holding portion of the planetary carrier has a first supporting surface that slidably supports tooth tip surfaces of one of the two large and small gear portions whose pitch circle diameter is larger, on all peripheral portions thereof except on one of a radially inner side and a radially outer side with respect to the carrier where the one of the two large and small gear portions meshes with one of the internal gear and the sun gear, and a second supporting surface that slidably supports tooth tip surfaces of the other of the two large and small gear portions whose pitch circle diameter is smaller, on all peripheral portions thereof except on the other of the radially inner side and the radially outer side with respect to the carrier where the other of the two large and small gear portions meshes with the other of the internal gear and the sun gear.

* * * * *